United States Patent [19]

Melwisch

[11] 4,245,234

[45] Jan. 13, 1981

[54] METHOD OF RECORDING COLOR TELEVISION SIGNALS AS A REPETITIVE SERIES OF NORMALLY RECORDED LINES AND PHASE REVERSED LINES

[75] Inventor: Harald E. Melwisch, Vienna, Austria

[73] Assignee: U.S. Philips Corporation, New York, N.Y.

[21] Appl. No.: 960,427

[22] Filed: Nov. 13, 1978

[30] Foreign Application Priority Data

Dec. 2, 1977 [AT] Austria .................................. 8654/77

[51] Int. Cl.² .............................................. H04N 5/79
[52] U.S. Cl. ............................................. 358/8; 358/4
[58] Field of Search ................... 358/4, 8, 12; 360/18, 360/19, 21, 29, 30

[56] References Cited

U.S. PATENT DOCUMENTS

| | | | |
|---|---|---|---|
| Re. 29,975 | 4/1979 | Ishigake et al. | 358/4 |
| 3,939,485 | 2/1976 | Amari et al. | 358/4 |
| 4,117,509 | 9/1978 | deBoer | 358/4 |
| 4,134,126 | 1/1979 | Hirai | 358/4 |

Primary Examiner—John H. Wolff
Assistant Examiner—Donald McElheny, Jr.
Attorney, Agent, or Firm—Thomas A. Briody; William J. Streeter; Algy Tamoshunas

[57] ABSTRACT

For recording and/or reproducing color television signals steps are proposed which enable the crosstalk signal from an adjacent track to be suppressed during reproduction. This is possible both for the chrominance signal and for the luminance signal. For this purpose the polarity of the signals in the line periods in all tracks is switched during recording in periodically recurrent groups with the same pattern of consecutive polarities, the groups comprising at least four line periods and being offset relative to each other in adjacent tracks by at least one line period. During reproduction the signals scanned from the relevant track whose polarities have been switched, at least in respect of the chrominance signal, are restored to signals with the original polarities. The frequency spectra of the useful signal relative to the crosstalk signal from an adjacent track are then interlaced, which is utilized for suppressing the crosstalk signal.

9 Claims, 7 Drawing Figures

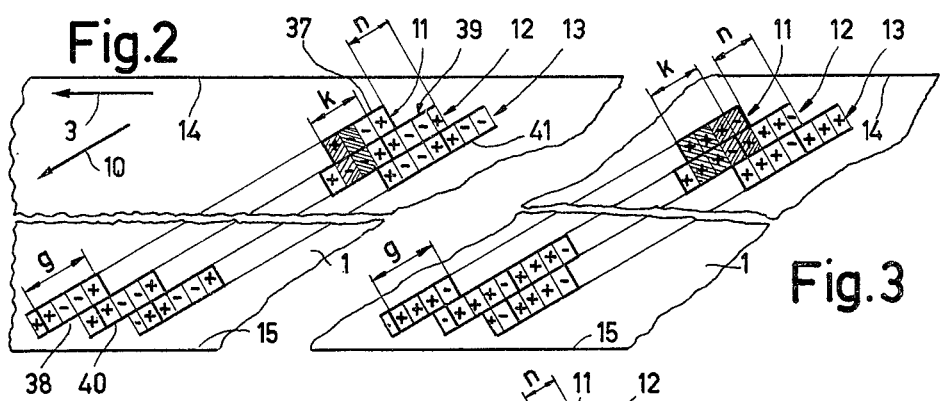
Fig.2
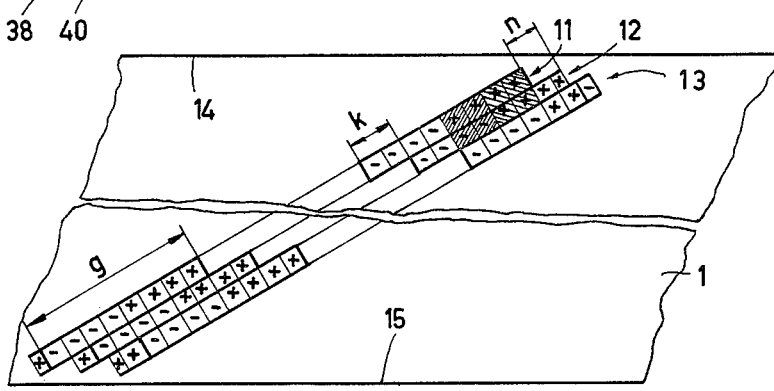
Fig.3
Fig.4
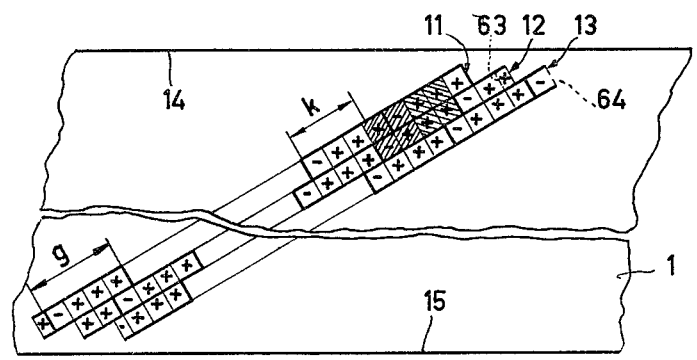
Fig.5
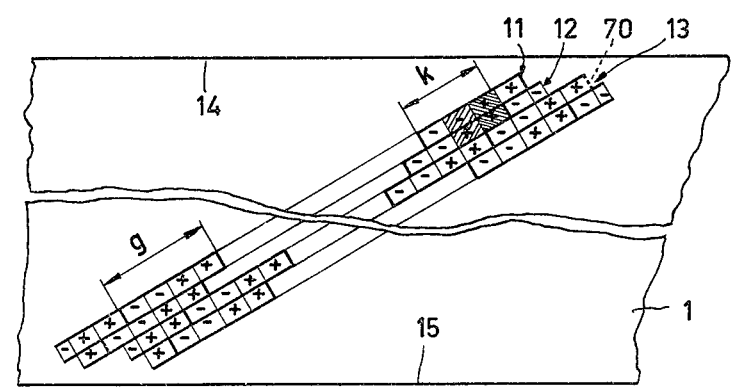
Fig.7

METHOD OF RECORDING COLOR TELEVISION SIGNALS AS A REPETITIVE SERIES OF NORMALLY RECORDED LINES AND PHASE REVERSED LINES

SUMMARY OF THE INVENTION

The invention relates to a method of recording colour television signals, in accordance with which the individual line-period sectors in adjoining tracks on the record carrier are aligned relative to each other in a direction perpendicular to the tracks. In at least one of two adjoining tracks the polarity of the signals to be recorded, which are modulated on a carrier is switched over periodically in the line periods. Signals which exhibit maxima in the frequency spectrum at distances of half the line frequency are recorded in such a manner the signals of two consecutive line periods in a track relative to the two line periods adjoining these in an adjacent track pairwise exhibit alternately the same and different polarities. For signals which exhibit maxima in the frequency spectrum at distances corresponding to the whole line frequency, the signals of the individual consecutive line periods in adjacent tracks alternately exhibit the same and different polarities with respect to each other. With such a method, as described in DT-OS No. 24 36 941, it is achieved that during reproduction of signals thus recorded the influence of signals recorded in adjacent tracks is minimized, i.e. that interference as a result of crosstalk from adjacent tracks can be minimized. In accordance with such a method the chrominance signals are recorded in unmodified form in one track, in which generally one home is recorded and are recorded in the adjoining next track with a carrier-signal polarity which changes in consecutive line periods. For chrominance signals in accordance with the NTSC standard, which exhibit maxima in the frequency spectrum at distances the whole line frequency, the polarity of the chrominance signal in the relevant tracks is then changed from line period to line period, whereas for chrominance signals in accordance with the PAL standard, which exhibit maxima in the frequency spectrum at distances half the line frequency, the polarity of the chrominance signals are changed pairwise after every two line periods. Thus, chrominance signals are recorded in two adjoining tracks, which exhibit a different mean frequency, which results in interleaving of the frequency spectra of these signals. During reproduction of signals thus recorded, during which signals whose polarity has been switched are restored to their original polarity, the crosstalk signals can then be separated from the useful signal, for example by means of a comb filter. As is evident from the foregoing, it is therefore necessary to decide from track to track whether the polarity of the chrominance signals is to be changed alternately or not, which during reproduction of signals thus recorded should be effected in exactly the same way as during recording in perfect synchronism, because otherwise, disregarding other disturbances, the frequency spectra are not interlaced and thus the crosstalk is not eliminated. It is therefore of particular importance that the transition from one track, in which the signals have been recorded in unmodified form, to the next track, in which the signals have been recorded with changed polarity, can be identified exactly and that restoration of the polarity of the signals begins with the correct polarity at the correct instant. As a result of this, such arrangements for changing the polarity are comparatively critical in respect of their operation, as for example follows from DT-OS No. 25 06 850.

It is the object of the invention to eliminate said problems in a simple manner. Therefore, a method as described in the preamble is characterized in that in all tracks the polarities of the signals in the line periods is changed in periodically recurring groups with the same pattern of consecutive polarities, that the groups comprise at least four line periods, i.e. an integral multiple and also an even multiple thereof, for a signal which exhibits maxima in the frequency spectrum at distances corresponding to half the line frequency and are offset relative to each other by at least one line period in adjacent tracks. Since the polarity of the signals is now switched in the same sense in all consecutive tracks, it is achieved that the switching sequence of the polarity of the signals can be the same from track to track. Furthermore, it follows that the signals recorded in the individual tracks all exhibit the same mean frequency and the frequency spectra of the signals of adjacent tracks are only interlaced in the reproduced signals, when their original polarity is restored.

It is found to be advantageous if the groups extend continuously over the adjacent tracks without interruption of the pattern, in compliance with the requirement $$z + n - xg - k = 0$$

where z is the number of line periods in one track, n the number of line periods corresponding to a line offset between adjacent tracks at the beginning and at the end, g the number of line periods in a group, x is an integer smaller than the result of dividing z by g, and k the number of line periods by which the groups in adjoining tracks are offset relative to each other. Thus, the polarity of the signals in the line periods can be switched in a particularly simple manner, because at the transition from one track to the next track the sequence of the polarity changes need not be altered.

It is also found to be advantageous if for an adaptation of the patterns of consecutive polarities during the transition from one track to the next track a phase shift is introduced in the polarity switching of the signals in the line periods. Thus, the number of groups and patterns that can be selected is increased, while by the introduction of a phase shift at the transition from one track to the next track the patterns, which are the same in all tracks, can simply be adapted to each other.

It is found to be particularly advantageous if for the signals to be recorded, which have been modulated on a carrier, the polarity of the signals in the line periods is switched both for the signals which transmit the chrominance information and for these which transmit the luminance information of the color television signals. In this way, crosstalk between adjacent tracks cannot only be eliminated for the chrominance signals but also for the luminance signals. Obviously, it is then possible to select different groups and patterns for each the two types of signals. In this respect it is found to be advantageous if in the case of color television signals in which the signals to be recorded, which are modulated on a carrier, and which transmit the chrominance information and the luminance information of the color television signals, both exhibit maxima in the frequency spectrum at distances corresponding to the whole line frequency, the polarity of the signals in the line periods is switched jointly for both these signals, in equal groups with equal patterns of consecutive polarities. Thus, the polarity of the both types of signals can be switched very simply for NTSC standard color television signals.

Furthermore, the invention relates to a method of reproducing signals recorded in accordance with the previously outlined inventive method. For this the invention is characterized in that of the signals whose polarity has been switched and which have been scanned from the relevant track, at least those signals, which are quadrature modulated on a carrier, are restored to signals with the original polarity. Thus, the signals scanned from the relevant track and the crosstalk signals as a result of crosstalk from an adjacent track are not converted into signals which exhibit frequency spectra which are interlaced relative to each other until during reproduction, which enables the crosstalk signals to be suppressed. In this respect it has been found that for the signals which are frequency-modulated on a carrier, as is common practice for recording the signals which convey the luminance information, it is not absolutely necessary to restore these signals to their original polarity, because demodulators for frequency-modulated signals inherently respond to the different polarities of the carrier signal and thus given rise to frequency interlacing between the useful signal and the crosstalk signal.

In the case of color television signals in which the signals to be recorded, which are modulated on a carrier and which transmit both the chrominance information and the luminance information of the color television signals, both exhibit maxima in the frequency spectrum at distances of the whole line frequency, the polarity of the signals in the line periods during recording being switched jointly for both signals in equal groups with equal patterns of consecutive polarities, it is found to be advantageous as a reproduction method, if the signals which have been scanned from the relevant track and whose polarity has been switched, as the case may be after amplification, are directly restored to signals with the original polarity, after which the signals which convey the chrominance information and the luminance information are further processed. Thus, a particularly simple circuit arrangement is also obtained for reproduction.

Furthermore, the invention relates to a recording and/or playback apparatus for color television signals, which comprise at least one device for switching the polarity of the signals in the line periods, which device is controlled by a control device, which for deriving the control quantity receives at least one signal of line synchronizing frequency. Such apparatus is also described in the previously cited DT-OS No. 24 26 941. In accordance with the invention such apparatus, for carrying out the inventive method as defined in the foregoing, is characterized in that the control device comprises a counter which receives the signal of line synchronizing frequency at its input and has a number of counter positions equal to the number of line periods in a group. The counter is connected to a decoding device which is programmed in accordance with the pattern of consecutive polarities in a group and provides an output in which the control quantity for the polarity switching device is available, which quantity is in conformity with said pattern. Thus, the polarity switching of the signals, which is necessary for recording and/or playback, is defined in a simple manner.

It is found to be advantageous if the input of the counter is preceded by a switching stage for changing the signal which advances the counter in a predetermined line period. The switching stage receives the signal of line synchronizing frequency at one input and a pulse which appears depending on the transition from one track to the next track at a further input. This pulse initiates said change, a phase shift in accordance with the pattern of consecutive polarities being introduced in the control quantity which is supplied to the polarity switching device by the decoding device. During recording and/or playback it is thus simply possible, by influencing the counter, to introduce a non-recurrent suitable phase shift in the polarity switching of the signals during a track transition.

Finally, the invention relates to a record carrier, on which color television signals, which have been recorded in accordance with one of the inventive methods as described hereinbefore, are recorded.

DESCRIPTION OF THE DRAWINGS

The invention will be described in more detail with reference to the drawings, which show some embodiments of the invention, to which it is not limited.

FIG. 2 schematically shows a track configuration for the luminance signal, associated with the embodiment of FIG. 1.

FIG. 3 schematically shows a track configuration for the chrominance signal, associated with the embodiment of FIG. 1.

FIG. 4 schematically represents a track configuration for a PAL-standard chrominance signal with a different group and pattern arrangement as in the case of the embodiment of FIG. 1, FIG. 5 shows a track configuration for a PAL-standard chrominance signal a phase shift being introduced in the pattern at the transition from one track to the next track.

FIG. 7 schematically represents the track configuration for the embodiment of FIG. 6.

DETAILED DESCRIPTION OF THE PREFERRED EMBODIMENT

Figure 1:
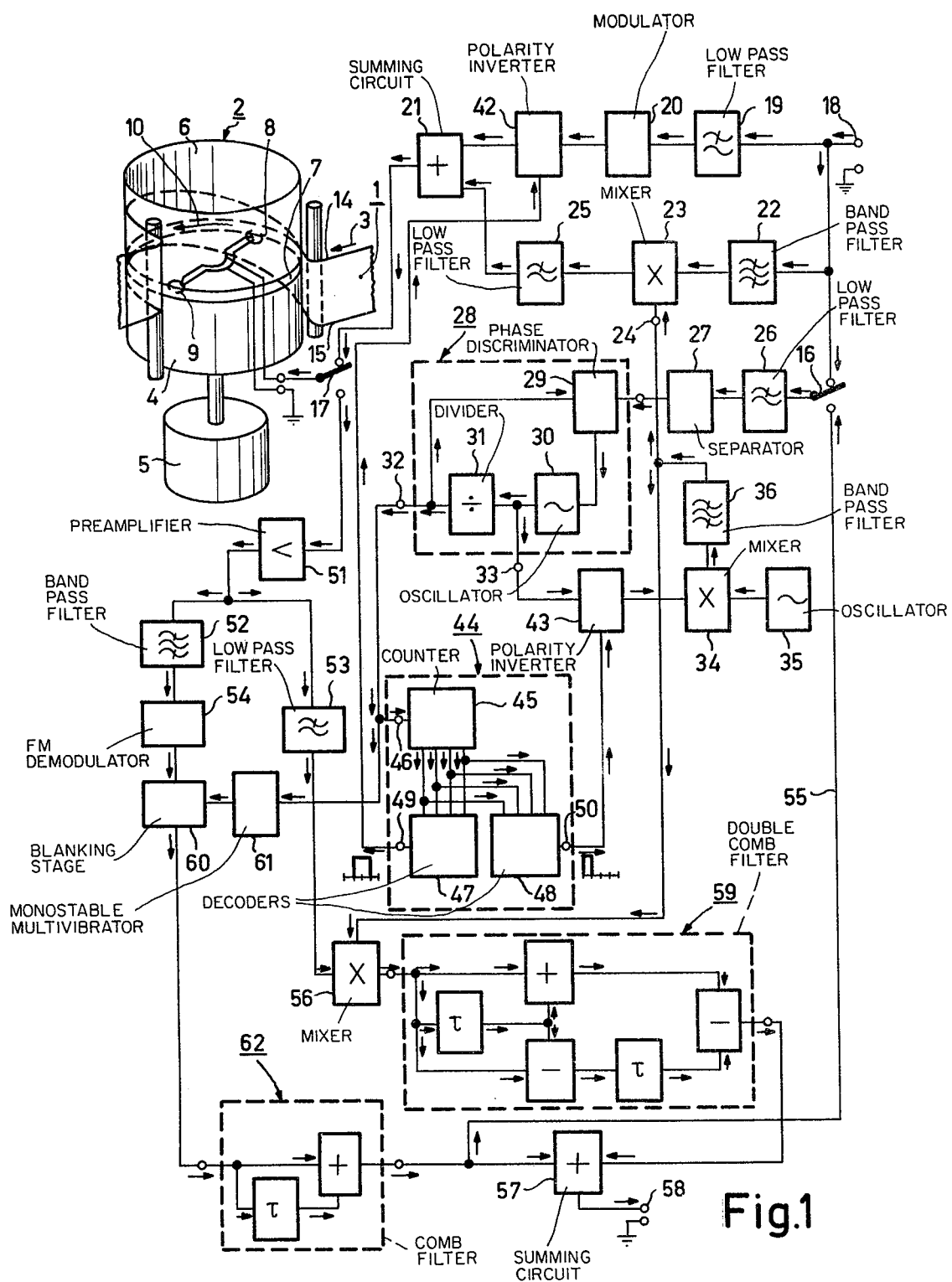
FIG. 1 is a block diagram of those parts of a PAL-standard color television recording/and playback apparatus which are relevant for the invention, in which apparatus both the polarity of the luminance signal and that of the chrominance signal are switched, but in which the patterns for switching the polarity of the two signals are different.

The embodiment of FIG. 1 relates to a apparatus for magnetically recording and/or reproducing color television signals in accordance with the so-called helical scan method on a record carrier 1 in the form of a tape, which is passed over the peripheral surface of a drum 2 in a helical path through a 180° angle. The record carrier is then moved in the direction of the arrow 3. The drum 2 consists of a stationary section 4 and a section 6 which is rotatable by a motor 5, which sections relative to each other form a gap 7, from which two magnetic heads 8 and 9 project. The heads 8 and 9 are arranged diametrically opposite each other and are mounted on the rotatable drum section 6. The direction of rotation of the drum section 6 and thus of the magnetic heads 8 and 9 is counterclockwise in accordance with the arrow 10. In this way the magnetic heads 8 and 9 consecutively scan the oblique tracks which are adjacently arranged on the record carrier 1, as is schematically shown in FIG. 2, three consecutive tracks being designated 11, 12 and 13. The beginning of each track is then situated near the edge 14 and the end of each track near the edge 15 of the record carrier 1, in accordance with the direction of scanning which is defined by the direction of rotation 10 of the magnetic heads when the record carrier is moved in the direction of the arrow 3 and when the carrier is threaded around the drum as shown in FIG. 1. The system parameters, such as speed of the record carrier, number of revolutions of the magnetic heads, drum diameter and the manner in which the record carrier is passed around said drum, are selected in known manner in such a way that at the transition from one track to the next track there is a line offset, designated n, of 2.5 lines of the color television signals. In this way one field can be recorded in each track, because in accordance with television standards each field begins with a full line and terminates with a half line and the next field begins with a half line and terminates with a full line. The individual line periods are represented by rectangles, half a line corresponding to a rectangle of half the width. The choice of the system parameters furthermore ensures that the individual line period sectors are aligned relative to each other, in known manner, in a direction perpendicular to the tracks.

Switching the apparatus to recording or playback is effected by means of two switched 16 and 17, which are shown in the RECORDING mode in FIG. 1. The color television signal to be recorded, in the present invention a PAL signal in accordance with the European standard, is applied to the terminal 18, from which it is fed to three signal paths. In one of said paths this signal is applied to a low-pass filter 19, at whose output the luminance signal appears. This signal is applied to an FM modulator 20 in the usual manner, which modulator converts it into a frequency-modulation signal suitable for magnetic recording, which is further applied to the input of a summing circuit 21, whose output is connected to the magnetic heads 8 and 9 via the switch 17. In a further signal path the color television signal from the terminal 18 is applied to a band-pass filter 22, at whose output the chrominance signal is available, which consists of a carrier having a frequency of 4.43 MHz, on which color-difference signals are quadrature-modulated. This chrominance signal arrives at a mixing stage 23, which at an input 24 receives a subcarrier having a frequency of 5.055 MHz, so that at the output of the mixing stage a signal with a carrier having a frequency of 625 kHz is obtained, which is then used for magnetic recording in the usual manner. This signal, which is available at the output of the mixing stage 23, is applied to a further input of the summing circuit 21 via a low-pass filter 25, so that it also reaches the magnetic heads 8 and 9 via the switch 17. The third signal path which begins at the terminal 18 serves for recovering the synchronizing pulses. Via the switch 16 this path leads from the terminal 18 to a low-pass filter 26, to which a separator stage 27 for the synchronizing pulses is connected. The output signal of this separator stage is applied to a flywheel circuit 28 in the usual manner, which circuit comprise a phase discriminator 29, which controls an oscillator 30 with a frequency of 625 kHz, whose output signal is applied to a divider stage 31, which divides the frequency of the oscillator signal by the factor 40, so that at its output a signal with the frequency of the line synchronizing pulses, i.e. 15,625 Hz, is available, which is also applied to the phase discriminator 29 and which also appears on an output 32 of the flywheel circuit 28. The signal from the controlled oscillator 30 furthermore reaches a further output 33 of the flywheel circuit 28, from which it is further applied to a mixing stage 34, which also receives the signal from an oscillator 35, which operates with a frequency of 4.43 MHz, so that the mixing stage supplies the desired signal for the subcarrier with a frequency of 5.055 MHz which via a band-pass filter 36 arrives at the input 24 of the mixing stage 23.

In the present embodiment both the polarity of the chrominance signal, which is quadrature-modulated on a 625 kHz carrier, and of the luminance signal, which is frequency-modulated on a carrier wave, which signals for the sake of simplicity are referred to hereinafter as chrominance signal and luminance signal respectively, are suitable switched during the line periods. In this respect it is essential that in all tracks the polarity of the signals in the line periods is switched in periodically recurring groups with the same pattern of consecutive polarities. The groups then comprise at least four line periods and in adjacent tracks they are offset by at least one line period relative to each other. In the present embodiment a case is described where the groups continuously extend over the adjoining tracks without interruption of the pattern. In order to achieve this, the requirement:

$$z+n-xg-k=0$$

should be met. Herein, z designates the number of line periods in one track, n the previously mentioned number of line periods corresponding to a line offset between adjacent tracks at the beginning and at the end, g the number of line periods in one group, x an integer smaller than z divided by g, and k the number of line periods by which the groups in adjacent tracks are offset relative to each other.

Hereinafter the method of processing the luminance signal is described first. In the present case the number of lines per field and thus the number of line periods in one track is z=312.5. As previously stated, a line offset of n=2.5 was selected. Furthermore, it is assumed that one group should comprise four line periods, so that z divided by g is 78.125, so that as smaller integer x=78 may be taken. From the foregoing requirement it follows therefore that k=3. This means that the groups in adjoining tracks are offset by three line periods relative to each other, so that in accordance with the said requirements k should oppose the scanning direction of the track by the magnetic heads as indicated by the arrow 10 in FIG. 2. The relevant situation is represented by FIG. 2, in which the individual groups are represented by heavily framed areas. In the track 11 the first group is designated 37 and the seventy-eighth group 38. In the track 11 the group 38 is then followed by half a line, which continues in the track designated 12 in the first group with the reference 39. In the track 12 the seventy-eighth group, which is designated 40, is followed by a full line, which in the track 13 is followed by three further lines, which in this track constitute the first sub-group designated 41, which is then followed by the further groups. It is evident from this that the groups actually extend continuously over the adjoining tracks without interruption of the pattern.

If the direction of rotation of the magnetic heads is reversed, the same considerations are valid, but the value for n in the said requirement should be given a negative sign. Furthermore, it is self-evident that for a group with four line periods three different values of k can be obtained, namely 1, 2 and 3. In the present example k=2 would result in a line criterion n=1.5, and k=1 in n=0.5.

When the polarity switching pattern is chosen allowance is to be made for the type of signal to be switched. In the present case it concerns the luminance signal, which relative to its carrier exhibits maxima in the frequency spectrum at distances of the full line frequency. For such a signal the signals of the individual consecutive line periods in adjacent tracks should alternately be of the same and different polarity relative to each other, in order to enable suppression of crosstalk signals from adjacent tracks during reproduction of the recorded signals, as is to be explained hereinafter. Hereinafter, the polarity of a signal in a line period is designated plus (+), if this is the original polarity, i.e. if it has not been changed, and minus (−), if the polarity of the signal in a line period has been reversed intentionally. Thus, in this case the polarities of the signals in the line periods should be +,+ or −,− during adjacent line periods of two adjacent tracks, and +,− or −,+ for the adjoining line periods of two adjacent tracks. For the selection of the pattern of consecutive polarities within a group allowance is to be made for the choice of k in respect of the number of line periods by which the groups are offset relative to each other in adjacent tracks. For example in the present case for k=3 a pattern with a sequence of polarities of +,−,−,+ as shown in FIG. 2 is suitable. As can be seen, the polarities in the line periods of adjoining tracks are then alternately the same and different, as is indicated by the hatched line-periods in FIG. 2. Further patterns, which meet the said requirement, would be those patterns which result from a different choice of the starting point for four line periods within said sequence of polarities, such as −,−,+,+ or −,+,+,− or +,+,−,−. In principle, this requirement is also met by the inverse pattern, which is obtained by reversal of all polarities, which in the present case are already covered by the examples given owing to the symmetrical configuration of the pattern. The same patterns can also be used when k=1 is selected. However, for the case k=2 a non-symmetrical pattern should be chosen, as for example +,+,+,−, which may again be modified as previously stated.

Similar considerations are valid for the manner in which the polarity of the chrominance signal is to be switched. As this signal is of course recorded under similar conditions, as the luminance signal, the same criteria should be applied in respect of the choice of the line periods in a group g and the number of line periods k by which the groups in adjacent tracks are offset relative to each other to obtain the selected line offset of n=2.5. From the previously stated requirement it follows that for the chrominance signal g=4 and k=3. In the present case these values are consequently equal to those for the luminance signal, which is of advantage for realizing the polarity switching. The relevant situation is represented in FIG. 3. In practice the track configurations of FIGS. 2 and 3 are of course superimposed, because the two signals have been recorded simultaneously in the same track. In respect of the choice of the pattern of polarities in one group allowance should be made for the fact that a PAL-standard chrominance signal is to be switched. This chrominance signal is a signal which exhibits maxima in the frequency spectrum at distances of half the line frequency. For such a signal the signals of two consecutive line periods in one track, relative to the two line periods which adjoin them in an adjacent track, should alternately have the same and different polarities per pair, so as to enable a suppression of crosstalk signals from adjacent tracks during reproduction of the recorded signals, as will be explained hereinafter. Consequently, this means that in one pair of adjacent line periods of two adjacent tracks the polarities should be +,+; +,+ or −,−; −,− or +,+; −,− or −,−; +,+ and in the following pair of adjacent line periods of two adjacent tracks −,+; +,−; or +,−; −,+ or +,−; +,−; or −,+; −,+. When choosing the pattern allowance should be made again for the previously selected value of k. In the present case where k=3, a pattern is for example obtained with a sequence of polarities of −,+,+,+ within a group, as is shown in FIG. 3. Thus, as can be seen, the requirement is met that adjoining pairs of line periods of two adjacent tracks alternately have the same and different polarities, as is indicated by the hatched line periods in FIG. 3. The requirement in respect of the pairwise equality or inequality of the polarities in adjacent line periods of two adjacent tracks is met again as a result of a different choice of the starting point for four line periods within the pattern constituted by the said sequence of polarities, as for example +,+,−,+ and the inverse patterns, as for example −,−,+,−. The same patterns can also be used for the choice k=1. However, because of the previously mentioned requirement in respect of the pairwise sequence of polarities, k=2 is then not possible for a group of only four line periods, in which case a different value should be selected for g as will be explained hereinafter.

For the formation of the patterns for the luminance signal and the chrominance signal as shown in FIGS. 2 and 3, a device for switching the polarity of the signals in the line periods is provided for each of them, which devices are controlled by a control device to which a signal of line synchronizing frequency is applied to obtain the control quantity. In the present example this is effected by polarity inverters, which transfer the signals applied to them either with a 0° or a 180° phaseshift. For the luminance signal such a polarity inverter 42 is included between the output of the FM modulator 20 and the relevant input of the summing circuit 21. For the chrominance signal polarity reversal is effected via the subcarrier frequency supplied by the mixing stage 34, for which purpose a polarity inverter 43 is included between the output 33 of the flywheel circuit 28 and the relevant input of the mixing stage 34, which inverter accordingly influences the phase of the signal supplied by the oscillator 30, so that the phase of the 5.055 MHz subcarrier is influenced, which is applied to the input 24 of the mixing stage 23, as a result of which finally the 625 kHz carrier on which the chrominance signal supplied by the mixing stage 23 is quadrature-modulated and which is applied to the further input of the summing circuit 21 via the low-pass filter 25, is subjected to the appropriate 0° or 180° phase shaft. For controlling the two polarity inverters 42 and 43 there is provided a control device 44, which comprises a counter 45, which at its input 46 receives the signal or line synchronizing frequency which is available at the output 32 of the flywheel circuit. This counter has a number of counter positions equal to the number of line periods in one group, so that in this case it has four counter positions and accordingly counts continuously from one to four in the rhythm of the line synchronizing frequency, the instantaneous count appearing at the four outputs of the counter. To these four outputs of the counter two decoding devices 47 and 48 are connected, the decoder 47 being associated with the polarity inverter 42 and the decoder 48 with the polarity inverter 43. These decoders are programmed in accordance with the patterns of consecutive polarities in a group, so that depending on the count they supply a signal when a polarity is to be changed from + to −. Similarly, the decoder 47 is programmed in accordance with the pattern of FIG. 2 for the luminance signal, so that it supplies a pulse at its output 49 each time that the count two or three is reached. Thus the pattern +,−,−,+ is formed. In a similar way the decoder 48 is programmed in accordance with the pattern of FIG. 3 for the chrominance signal, so that it always supplies a signal at its output 50 when the counter 45 reaches the count one, so that the pattern −,+,+,+ is formed. The outputs 49 and 50 of the two decoders are connected to corresponding inputs of the polarity inverters 42 and 43 respectively.

Thus it is achieved that in all tracks the polarities in the line periods for both the luminance signal and the chrominance signal are switched in periodically recurring groups with the same pattern of consecutive polarities, the groups extending continuously over the adjacent tracks without interruption of the pattern.

For the reproduction of signals which have thus been recorded on a record carrier the switches 16 and 17 are changed over. The signals which have been scanned by the magnetic heads 8 and 9 are then applied to a preamplifier 51 via the switch 17, from which preamplifier they are applied both to a band-pass filter 52 and to a low-pass filter 53. With the aid of the band-pass filter 52 the luminance signal is recovered, which is subsequently applied to an FM demodulator 54, at whose output the demodulated luminance signal is available. This signal, which also comprises the synchronizing pulses, reaches the switch 16 via the line 55, which switch applies it again to the low-pass filter 26 and the separator stage 27 for the synchronizing pulses, which in its turn feeds the flywheel circuit 28, so that also during reproduction a signal with the line synchronizing frequency is available at the output 32 of said circuit and a signal with a frequency of 625 kHz at its output 33. The last-mentioned signal again reaches the mixing stage 34, which moreover receives the signal from the oscillator 35, so that at its output the subcarrier with a frequency of 5.055 MHz is available again.

With the aid of the low-pass filter 53 the chrominance signal, which is quadrature-modulated on a 625 kHz carrier, is extracted and subsequently applied to a mixing stage 56, which furthermore receives the 5.055 MHz sub-carrier via the band-pass filter 36, so that at its output the chrominance signal modulated on a 4.43 MHz carrier is available again. In a summing circuit 57 the luminance signal from the FM demodulator 54 and the chrominance signal from the mixing stage 56 are recombined, so that the complete color television signal is available at the output 58 of the summing circuit 57.

During reproduction the change in polarity of the signals in the line periods, which has been introduced in all tracks during recording, is eliminated at least for the chrominance signal. For the chrominance signal this is effected in a similar way as during recording with the aid of the polarity inverter 43, which during reproduction also changes the polarity of the signal from the oscillator 30 obtained from the output 33 of the flywheel circuit 28 in accordance with the pattern of FIG. 3, so that this polarity change is also impressed on the subcarrier obtained from the mixing stage 34, which in its turn causes a change in polarity of the chrominance signal in the mixing stage 56. This polarity reversal is again controlled by the decoder 48, which each time that the count of the counter 45 is one causes a polarity reversal, so that the polarity inversion again proceeds in accordance with the pattern −,+,+,+. In this way the useful signal scanned from the relevant track is restored to its original polarity, so that it continuously has the + polarity.

If during reproduction there is crosstalk from chrominance signals recorded in an adjacent track, their polarity will be changed in the same rhythm as the useful signal. However, since the groups and thus the patterns in adjacent tracks are offset from each other by k=3 line periods, it follows that the crosstalk signal is not restored to its original polarity, but has a different polarity, after switching, namely with the sequence −,−,+,+ as can been seen in FIG. 3, when that polarity in an adjacent track is reversed which adjoins a negative polarity in a track which is just being scanned. However, this means that for the crosstalk component of the chrominance signal after reproduction and polarity inversion, the mean frequency changes, namely by a quarter of the line frequency, so that the maxima in the frequency spectrum are shifted, namely by a quarter of the line frequency relative to the maxima in the frequency spectrum of the chrominance signal in the useful signal, which follow each other with half the line frequency. This enables said crosstalk component to be filtered from the useful signal, which can effectively be performed by means of a double comb filter of conventional design. Accordingly, as is shown in FIG. 1, the mixing stage 56 is followed by a double comb filter 59, whose output signal is then applied to the summing circuit 57.

A similar situation is obtained when the luminance signal is reproduced. Also in this case the maxima in the frequency spectrum of the crosstalk signal are shifted relative to those of the useful signal, but in this case by half the line frequency, because the crosstalk signal is converted into a pattern +,−,+,− in a similar way as follows from FIG. 2 for the description of the chrominance signal. This demonstrates that for the luminance signal, which is frequency modulated on a carrier, restoring the polarity is not absolutely necessary, because FM demodulators inherently discriminate between the useful signal and the crosstalk signal on the basis of the different polarities, namely because an inverted useful signal results in an inversion in the demodulated crosstalk signal. Therefore, no separate polarity changing device has been provided for the reproduced luminance signal in the embodiment of FIG. 1. However, it is found to be effective when the FM demodulator 54 is followed by a blanking stage 60, which suppresses the signal at the instants at which a polarity reversal has been effected during recording, because at these instants the FM demodulator produces spurious signals as a result of the phase transients in the useful signal. Consequently, this blanking stage 60 may be controlled by the decoder 47. However, it is found to be simpler when it is directly controlled by the signal of line synchronizing frequency, which is available at the output 32 of the flywheel circuit 28, via a monostable multivibrator 61, because the signal is then simply suppressed during each line change. In this case the crosstalk signals are filtered out in a similar way as for the chrominance signal with a simple comb filter 62, because for the luminance crosstalk signal the frequency shift of the maxima in the frequency spectrum relative to the useful signal is equal to half the line frequency. As can be seen in FIG. 1, the comb filter 62 precedes the corresponding input of the summing circuit 57.

Thus, luminance and chrominance signals which are exempt from crosstalk signals are available at output 58 of the summing circuit 57. As an alternative to the embodiment which has been described, it is obviously also possible to switch the polarity of the luminance signal or of the chrominance signal during recording only. In this respect it is to be noted that for the suppression of the crosstalk signals it is not absolutely necessary to provide comb filters. This is in particular so when only weaker crosstalk signals are concerned, because with the obtaining frequency shift of the crosstalk signals relative to the useful signals an óptical suppression of the crosstalk signal is obtained on the picture screen, in known manner. Alternatively, it would be possible to change the polarity of the chrominance signal in a manner other than via the subcarrier, namely in that in a similar way as for the luminance signal the polarity of the carrier on which the chrominance signal is modulated is switched, in which case the polarity inverter should be included before or after the mixing stage 23 or 56.

Obviously it is also possible to form groups with more than four line periods, namely with an integral multiple for signals which exhibit maxima in the frequency spectrum at distances of the full line frequency and with an even integral multiple of four line periods for signals which exhibit maxima in the frequency spectrum at distances of half the line frequency. The reason for this difference between the two signal types is that in the first case the polarity should be alternately the same and different, and in the second case it should be pairwise the same and different in adjacent line periods from two adjacent tracks. To illustrate the last mentioned case, FIG. 4 shows an example for groups with eight line periods, with the requirement that the groups should continuously extend over the adjacent tracks without interruption of the pattern and that the signal is a PAL-standard color television signal. For a line offset of the adjacent tracks of $n=1.5$ it then follows that the number of line periods by which the groups in adjacent tracks should be offset relative to each other should be $k=2$. The pattern for switching the polarity of the signals in the line periods of a group may then be $+,+,+,+,-,-,-,-$. Also in this case there are further possibilities of choosing the parameters; as an example it is possible that $n=3.5$, $k=4$ and the relevant pattern is $+,+,+,+,+,+,-,-$.

However, it is also possible to switch the polarity of the signals in the line periods in periodically recurrent groups with the same pattern of consecutive polarities, in such a way that the groups do not continuously extend over the adjacent tracks without interruption. In such cases a phase shift in the polarity change of the signals in the line periods is introduced for an adaptation of the pattern of consecutive polarities at the transition from one track to the next track. Thus it is achieved that for the formation of groups and patterns further degrees of freedom become available and adaptation to the relevant system requirements is possible in a wide variety of manners.

FIG. 5 shows such an embodiment for a system and a chrominance signal in accordance with the example of FIG. 4. Groups with four line periods have been selected and in adjacent tracks they should be offset relative to each other by three line periods. As pattern for switching the polarity $+,+,+,-$ has been selected, while again, as is necessary for a PAL standard chrominance signal, the polarity is pairwise the same and different in adjacent line periods of two adjacent tracks. As can be seen in FIG. 5, there will be no continuity in the pattern at the transition from the track 11 to the track 12 and from the latter track to the track 13 under these assumptions. However, allowance can be made for this situation with the aid of the control device which controls the polarity switching sequence, in that a corresponding phase shift is introduced into the polarity switching. Such a phase shift may be introduced either briefly before or briefly after the track change. In the present example it is proposed to introduce this phase shift af the transition from the track 11 to the track 12, at the transition from one field to the other after the three-hundred-and-thirteenth line, and at the transition from track 12 to track 13 after the six-hundred-and-twenty-fifth line of the first picture, and before the first line of the next field of the next picture. These points of transition are represented by the dashed lines 63 and 64 respectively. As can be seen from the indicated polarities, the pattern should be advanced by one line period at these transitions. Thus, such a phase shift can simply be obtained in that at these points the counter of the control device is advanced by one count. The command for advancing the counter may then for example be derived from the field pulse of the colour television signal.

Figure 6:
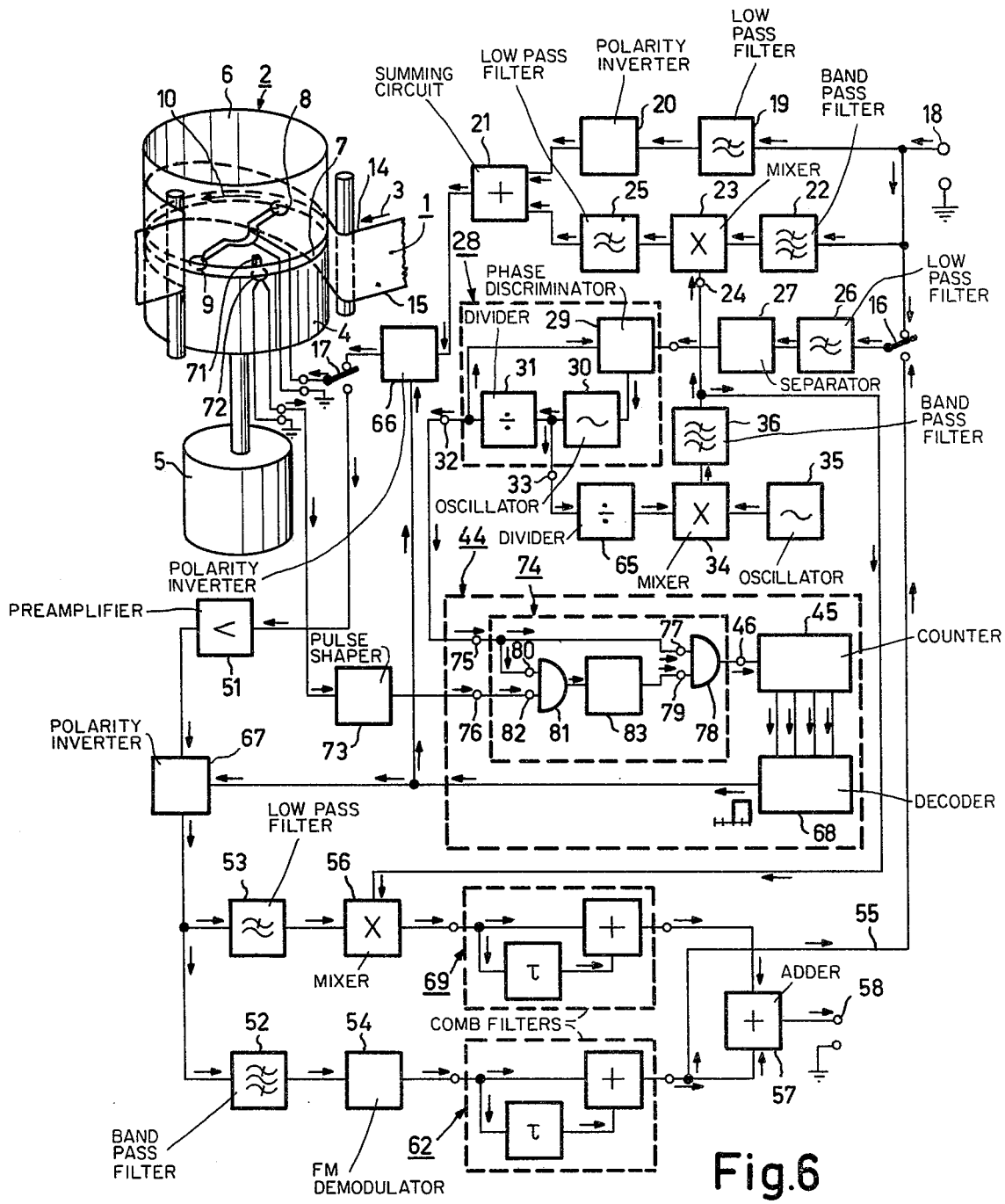
FIG. 6 is a block diagram of those parts, which are relevant for the invention, of a recording and/or playback apparatus for NTSC-standard color television signals, the luminance signal and the chrominance signal being jointly subjected to the same polarity switching.

The embodiment of FIG. 6 is a modification of the embodiment of FIG. 1 for an NTSC-standard color television signal, so that the basic operation is the same and hence need not be described once more. In conformity with an NTSC-standard signal the number of lines per field and thus per track is 262.5. In this case the oscillator 30 operates at a frequency of 2.53 MHz, which frequency is divided by one hundred and sixty by means of the divider 31 so as to obtain the line frequency of 15.734 Hz. The signal from the oscillator 30, which is available at the output 33 of the flywheel circuit, is now divided by four by a further divider 65 so as to obtain a value of 633.3 kHz, so that for a frequency of the oscillator 35 of 3.58 MHz a subcarrier with a frequency of 4.21 MHz is obtained at the output of the mixing stage 34. The chrominance signal on a 3.58 MHz carrier, which is applied to the mixing stage 23, is mixed with said subcarrier in said stage, yielding a signal with a 633.3 kHz carrier. During reproduction mixing is effected in a similar way in the mixing stage 56.

Since in an NTSC-standard colour television signal both the luminance signal and the chrominance signal exhibit maxima in the frequency spectrum at distances of the whole line frequency, the polarity of the two signals in the line periods is suitably switched jointly in the same groups with the same patterns of consecutive polarities. Therefore, a single polarity inverter 66 has been provided for recording, which inverter follows the summing circuit 21, so that the polarities of the luminance signal and the chrominance signal are jointly switched in the appropriate manner. The same applies to reproduction, for which also one common polarity inverter 67 has been provided for both signals, which inverter follows the preamplifier 51 directly. Thus, these two polarity inverters 66 and 67 are jointly controlled by a single decoder 68, which is connected to the outputs of the counter 45 of the control device 44. The filter which is included after the mixing stage 56 during reproduction is constituted by a simple comb filter 69, because of the previously mentioned nature of the chrominance signal.

In the present example the system parameters for the transport of the record carrier and its scanning by the magnetic heads have been selected so that at a track transition from one field to the next field a line offset is obtained of half a line and at a track transition from one picture to the next picture a line offset of 1.5 lines. The relevant track configuration is shown in FIG. 7. The first field of a picture begins in the track designated 11 and it ends with half the two hundred-and-sixty-third line, which continues in the track designated 12, which in its turn ends with the five-hundred-and-twenty-fifth line of the second field, after which the first line of the first field of the next picture begins in the track designated 13. As can be seen, the line offset between track 11 and 12 is then half a line and between track 12 and 13 it is 1.5 lines.

For switching the polarity it is assumed that a group should again comprise four line periods. Because of the requirement $$z+n-x\,g-k=0$$

it is possible in the case of $n=0.5$, $x=65$ and $k=3$, that the groups continuously extend over the adjacent tracks without interruption of the pattern. This applies to the transition from track 11 to track 12. When $n=1.5$, however, said requirement is not met, so that at the transition from track 12 to track 13 an adaptation of the pattern of consecutive polarities is necessary by means of a phase shift in the polarity switching of the signals in the line periods. Because the two signal types exhibit maxima in the frequency spectrum at distances of the whole line frequency, the pattern for switching the polarities in a group should again be selected so that in adjacent lines of two adjacent tracks alternately the same and different polarities occur. Accordingly, the pattern $+,+,-,-$ is selected for polarity switching, from which the required polarity sequence follows, as can be seen in FIG. 7. Thus it is also ensured that at the transition from the track 11 to the track 12 the groups continuously extend over the two adjacent tracks without interruption of the pattern.

Furthermore, as can be seen in FIG. 7, the track 12 ends at the five-hundred-and-twenty-fifth line with a line period of positive polarity, which would belong to the first line period of a new group. However, the track 13, which corresponds to a $k=3$, should begin with a new group, from which the type of phase shift follows which is to be introduced to adapt the patterns to each other at a track transition. In this case this means that at the transition from the track 12 to the track 13, at the transition point represented by the dashed line 70, the counter 45 should be prevented from being advanced by one counter position, after which the continuity of the patterns is assured again. As can be seen, the relevant track transition occurs after each full revolution of the drum section 6 which carries the magnetic heads 8 and 9. In the present example the control signal for the introduction of the phase shift is suitably derived from the rotation of said drum section 6 For this purpose, as is indicated in FIG. 6, a permanent magnet 71 is mounted on said frum section 6, which upon each revolution of said section induces a pulse in a stationary magnetic head 72, which is processed accordingly in a pulse-shaper stage 73 and then applied to the control device 44 as an additional signal.

The control device 44 again comprises a counter 45, which has four counter positions in conformity with the number of line periods within a group. To the outputs of the counter 45 a decoding device 68 is connected, which in the present example is programmed in such a way that each time that the counter reaches the counts three and four it supplies a pulse which, as is required, defines the pattern for switching the polarity in a group as $+,+,-,-$. The input 46 of the counter 45 is now preceded by a switching stage 74, which at an input 75 receives the signal of line synchronizing frequency appearing at the output 32 of the flywheel circuit 28 and at a further input 76 the pulse supplied by the pulse-shaper stage 73. The signal of line synchronizing frequency applied to the input 75 of the switching stage is applied to the input 77 of a gate circuit 78, which transfers said signal when no input signal appears at its control input 79, in which case the counter 45 is advanced continuously. On the other hand, the signal of line synchronizing frequency is applied from the input 75 to the input 80 of an And-gate 81, which at its second input 82 receives the signal from the pulse-shaper stage 73 via the input 76 of the switching stage, so that this And-gate supplies an output signal when the pulse-shaped signal from the pulse-shaper stage 73 appears at the same time. With this signal a monostable multivibrator 83 is driven, whose output signal is applied to the control input 79 of the gate circuit 78. In this case the monostable multivibrator 83 is designed so that as soon as it is triggered it supplies an output signal for a duration of approximately 1.5 lines, which signal then closes the gate circuit 78 for said time interval. Then no signal of line synchronizing frequency reaches the input 46 of the counter 45 during this interval, so that this counter is not advanced for one line period and thus retains its instantaneous count. However, this means that the decoder 68 also retains its instantaneous output signal for one line period. As can be seen, the desired phase shift is thus realized, which adapts the pattern at the transition from the track 12 to the track 13.

Obviously, by suitably dimensioning the monostable multivibrator 83, the counter can simply be prevented from being advanced for more than one line period. On the other hand, it would also be possible without any further steps by suitably designing the switching stage 84, that upon the appearance of the pulse from the pulse-shaper stage 83 additional pulses are produced by means of monostable multivibrators included in the switching stage 74, so that the counter 45 is advanced more frequently than in conformity with the signal of line synchronizing frequency, as would for example be required for the embodiment of FIG. 5.

Further, in respect of the suppression of crosstalk signals from adjacent tracks the operation of the embodiment of FIG. 6 is fully analogous to that of the embodiment of FIG. 1.

Obviously, the steps described in the foregoing are also applicable to other recording and/or reproducing systems, in which there is a risk of crosstalk from an adjacent track as a result of closely adjoining tracks.

These may be spiral tracks on a disk-shaped record carrier or tracks which extend in the longitudinal direction of a record carrier in the form of a tape. Nor is there any limitation to magnetic recording or reproduction of the signals, but all types of recording and/or reproducing systems in which crosstalk from adjacent tracks may occur, may be involved, such as for example optical systems.

What is claimed is:

1. An improved method of recording color television signals in accordance with which the individual line period sectors in adjoining tracks on the record carrier are aligned relative to each other in a direction perpendicular to the tracks, and wherein in at least one of two adjoining tracks the polarity of the signals to be recorded, which are modulated on a carrier, is switched periodically in the line periods, while for signals which exhibit maxima in the frequency spectrum at distances corresponding to half the line frequency the signals of two consecutive line periods in a track relative to the two line periods adjoining these in an adjacent track exhibit alternately in pairs the same and different polarities, and for signals which exhibit maxima in the frequency spectrum at distances corresponding to the whole line frequency, the signals of the individual consecutive line periods in adjacent tracks alternately exhibit the same and different polarities with respect to each other, the improvement being characterized in that in all tracks the polarities of the signals in the line periods are switched in periodically recurring groups with the same pattern of consecutive polarities, the groups comprising at least four line periods, and are offset relative to each other by at least one line period in adjacent tracks.

2. A method as claimed in claim 1, characterized in that the groups extend continuously over the adjacent tracks without interruption of the pattern, in compliance with the requirement $$z+n-x\,g-k=0$$

where z is the number of line periods in one track, n the number of line periods corresponding to a line offset between adjacent tracks at the beginning and at the end, g the number of line periods in a group, x an integer smaller than z divided by g, and k the number of line periods by which the groups in adjoining tracks are offset relative to each other.

3. A method as claimed in claim 1, characterized in that for an adaptation of the patterns of the consecutive polarities at the transition from one track to the next track a phase shift is introduced in the polarity switching of the signals in the line periods.

4. A method as claimed in any one of the preceding claims, characterized in that for the signals to be recorded, which have been modulated on a carrier, the polarity of the signals in the line periods is switched both for the signals which transmit the chrominance information and for those which transmit the luminance information of the color television signals.

5. A method as claimed in claim 4, characterized in that it in the case of color television signals in which the signals to be recorded, which are modulated on a carrier, and which transmit the chrominance information and the luminance information of the color television signals, both exhibit maxima in the frequency spectrum at distances of the whole line frequency, the polarity of the signals in the line periods is switched jointly for both these signals, in equal groups with equal patterns of consecutive polarities.

6. A method of reproducing signals recorded in accordance with a method as claimed in claim 5, characterized in that of the signals whose polarity has been switched and which have been scanned from the relevant track, at least those signals, which are quadrature-modulated on a carrier, are restored to signals with the original polarity.

7. A method as claimed in claim 6, characterized in that the signals scanned from the relevant track, whose polarities have been switched are directly restored to signals with the original polarity, after which the signals transmitting the chrominance information the luminance information are further processed.

8. An apparatus for the recording and/or playback of color television signals of the type where individual line period sectors are recorded in adjoining tracks and are aligned relative to each other in a direction perpendicular to the tracks, wherein in at least one of two adjoining tracks the polarity of signals modulated on a carrier to be recorded is switched periodically in the line periods, while for signals exhibiting maxima in the frequency spectrum at distances corresponding to half the line frequency the signals of two consecutive line periods in a track relative to the two line periods adjoining these in an adjacent track exhibit alternately in pairs the same and different polarities, and for signals exhibiting maxima in the frequency spectrum at distances corresponding to the whole line frequency the signals of individual consecutive line periods in adjacent tracks alternately exhibit the same and different polarities with respect to each other, wherein in all tracks the polarities of the signals in the line periods are switched in periodically recurring groups with the same pattern of consecutive polarities, the groups comprising at least four line periods offset relative to each other by at least one line period in adjacent tracks, said apparatus comprising at least one device for switching the polarity of the signals in line periods, a control device means for controlling said switching means and receiving at least one signal of line synchronizing frequency, the control device comprising a counter which receives the signal of line synchronizing frequency at an input and having a number of counter positions equal to the number of line periods in a group, a decoding device connected to the counter and programmed in accordance with the pattern of consecutive polarities in a group and at whose output a control signal for the polarity-switching device is available, with said signal in conformity with said pattern.

9. An apparatus as claimed in claim 8, wherein from an adaption of the patterns of the consecutive polarities at the transition from one track to the next track a phase shift is introduced in the polarity switching of the line periods, characterized in that the input of the counter is preceded by a switching stage for changing the signal which advances the counter in a specific line period, which stage receives the signal of line synchronizing frequency at one input and a pulse which appears depending on the transition from one track to the next track at a further input, which pulse initiates said change, a phse shift in accordance with the pattern of consecutive polarities being introduced in the control signal which is supplied to the polarity switching device by the decoding device.

* * * * *

UNITED STATES PATENT AND TRADEMARK OFFICE
CERTIFICATE OF CORRECTION

PATENT NO. : 4,245,234
DATED : January 13, 1981
INVENTOR(S) : Harald E. Melwisch It is certified that error appears in the above—identified patent and that said Letters Patent is hereby corrected as shown below:

Claim 5, line 2, delete "it"

Claim 9, line 12 change "phse" to --phase--

Signed and Sealed this

Seventh Day of December 1982

[SEAL]

Attest:

GERALD J. MOSSINGHOFF

Attesting Officer     Commissioner of Patents and Trademarks